July 20, 1926.
C. J. GOUGLER
1,593,492
BULL WHEEL
Filed Oct. 31, 1924
2 Sheets-Sheet 1
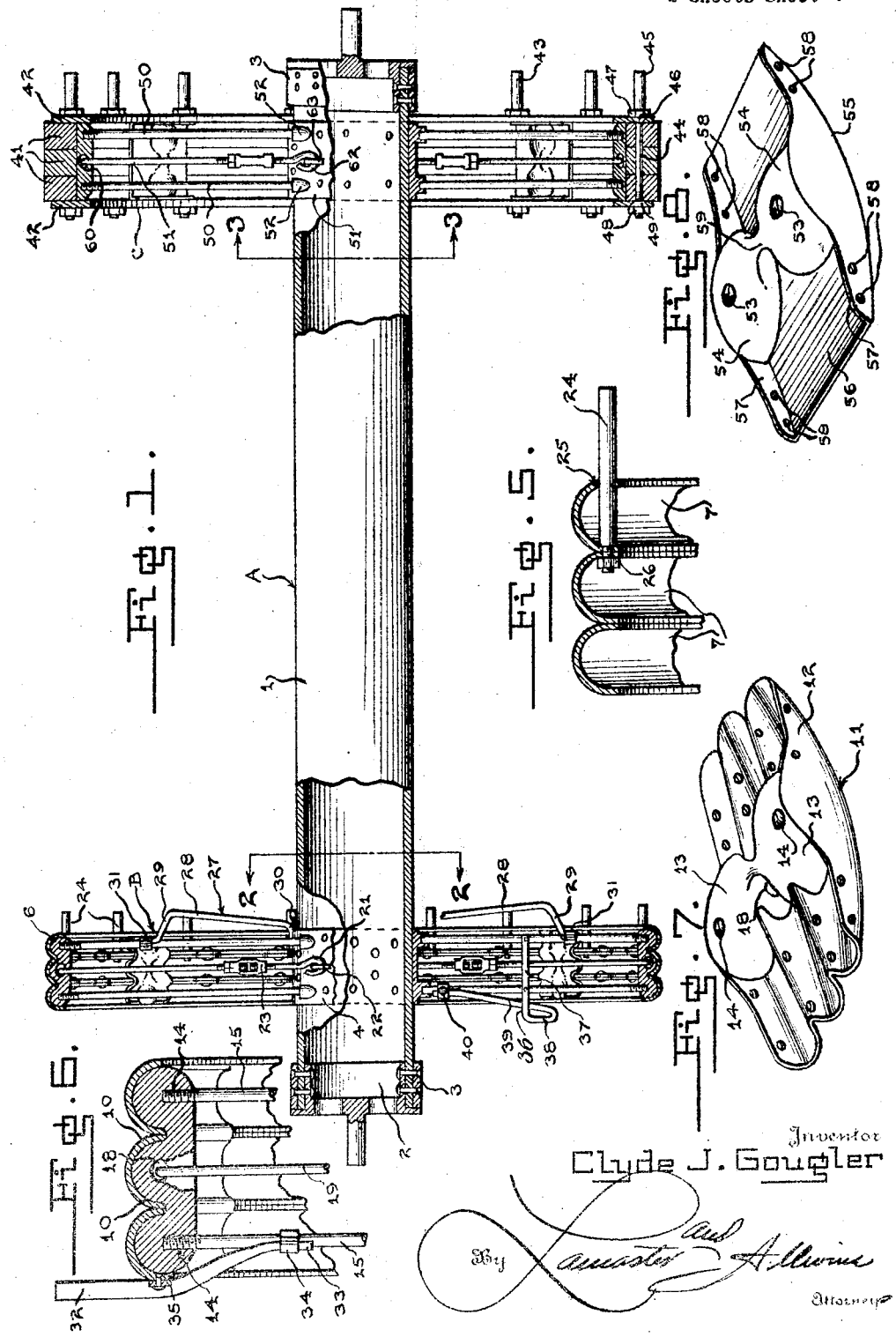
Inventor
Clyde J. Gougler July 20, 1926.  
C. J. GOUGLER  
BULL WHEEL  
Filed Oct. 31, 1924  
1,593,492  
2 Sheets-Sheet 2
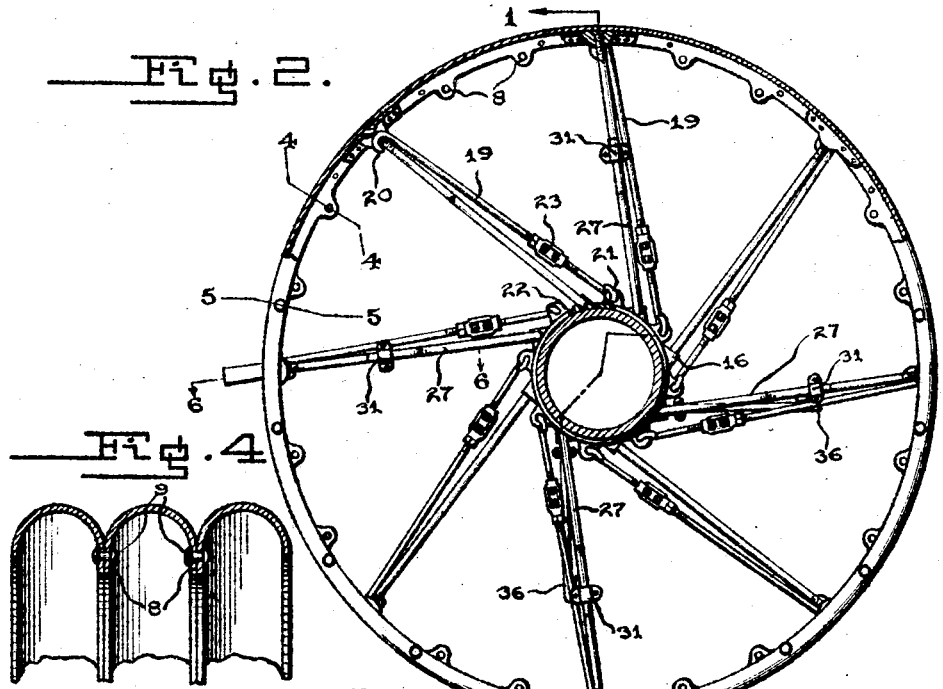
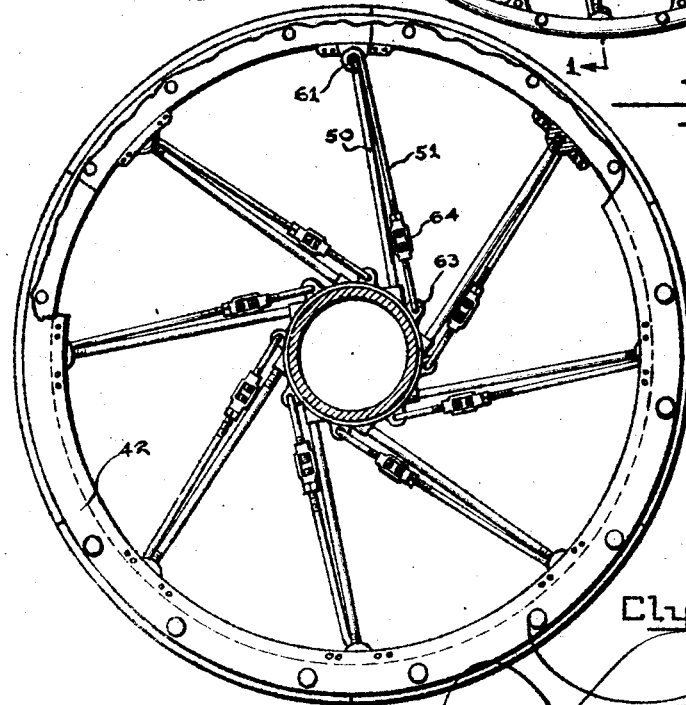
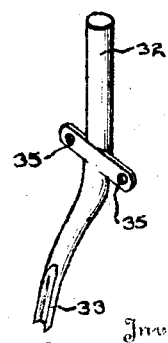
Inventor  
Clyde J. Gougler Patented July 20, 1926.

1,593,492

UNITED STATES PATENT OFFICE.

CLYDE J. GOUGLER, OF TULSA, OKLAHOMA.

BULL WHEEL.

Application filed October 31, 1924. Serial No. 747,094.

This invention relates to a bull wheel used as a part of a well rig and one object of the invention is to provide a bull wheel which may be formed entirely of metal and further provide a bull wheel formed of parts which may be easily and quickly assembled.

Another object of this invention is to provide a bull wheel which will be very rigid when the parts are assembled and which may be adjusted when necessary so that the parts forming this bull wheel may be kept rigid.

Another object of the invention is to provide a bull wheel having the tug wheel and brake wheel provided with improved socket members for engagement by spokes and truss rods, these socket members being rigidly carried by the wheel rims and held against transverse movement by the rims.

Another object of the invention is to so form the tug wheel that the rim thereof may be formed in sections U-shaped in cross section and having their side flanges secured together and these sections when connecting providing a tug wheel provided upon its outer surface with rope receiving grooves.

Another object of the invention is to provide the tug wheel with an improved rope engaging dog secured to the wheel and extending beyond its periphery and also to provide improved helpers secured to the spokes in an improved manner and extending beyond the outer side of the wheel.

Another object of this invention is to provide an improved type of rope guard carried by the tug wheel and extending from the inner side thereof.

Another object of the invention is to provide an improved type of brake wheel having a rim formed of arcuate block and metal side rings, the turning pins of this wheel being so secured that they serve as means for retaining the blocks and rings assembled.

Other objects will be brought out during the following description of the preferred form of the invention.

This invention is illustrated in the accompanying drawings wherein:—

Figure 1 is a view showing the improved bull wheel partly in elevation and partly in vertical section, the view being taken substantially along the line 1—1 of Figure 2.

Figure 2 is a view taken along the line 2—2 of Figure 1 with portions of the tug wheel broken away.

Figure 3 is a view taken along the line 3—3 of Figure 1 with portions of the brake wheel broken away.

Figure 4 is an enlarged transverse sectional view through the rim of the tug wheel taken along the line 4—4 of Figure 2.

Figure 5 is a transverse sectional view taken along the line 5—5 of Figure 2.

Figure 6 is a sectional view taken along the line 6—6 of Figure 2 and showing the manner of mounting the outer ends of the spokes and truss rods.

Figure 7 is a perspective view of one of the castings carried by the rim portion of the tug wheel and engaged by the spokes and truss rods.

Figure 8 is a perspective view of one of the spoke and truss rod engaging castings carried by the brake wheel.

Figure 9 is a perspective view of the rope engaging dog carried by the tug wheel.

Referring to the drawings wherein the preferred form of the invention is illustrated in detail and wherein similar characters indicate similar parts in all the views, it will be seen that this bull wheel is provided with a bull wheel shaft A adjacent the ends of which are mounted the tug wheel B and brake wheel C. This arrangement of parts is common to bull wheels of this character but from the following description it will be found that the shaft A and wheels B and C have been provided with special details of construction producing a very strong and efficient bull wheel.

The shaft A is formed from a length of tubing 1 which is circular in cross section and open at its ends. A head or gudgeon 2 is fitted in each end of the tubing 1 and secured by rivets or other fasteners which also serve as means for securing gudgeon rings 3 positioned about the end portions of the shaft and reinforcing the shaft. The shaft forming tube is also provided with openings inwardly of the gudgeon rings 3 so that the wheels B and C can be secured upon the shaft by rivets passing through the hub forming bands 4 and 5 of the wheels B and C.

The tug wheel B is provided with a rim 6 which is formed of a plurality of rings or hoops 7 each of which is U-shaped in cross section and have their adjacent side portions provided with ears 8 through which pass fastener rivets 9 so that the rings 6 will be securely held together and provide a rim having inner annular pockets and outer grooves 10. These grooves are V-shaped in cross sections and adapted to receive the usual tug wheel ropes. This rim 6 is disposed about the hub 4 and at points about its circumference is provided with socket members 11 which are formed as castings and each provided with a plate like body portion 12 which is corrugated transversely and curved longitudinally so that it will fit within the rim and conform to the contour thereof. This body portion may be secured to the rim in any desired manner but will preferably be secured by rivets passed through the body portion and rim forming rings. Thickened portions 13 are provided intermediate the length of the body portion and each has a threaded socket 14 to receive the outer end of a spoke 15. These spokes 15 are formed as solid bars which have their outer end portions threaded and screwed into the sockets 14 and their inner ends unthreaded and fitting into unthreaded sockets 16 carried by the hub 4 and disposed in alignment with the sockets 14. A neck portion 17 joins each pair of thickened socket forming portions 13 and this neck is provided with an eye 18 so that truss rods 19 may have their hook shaped outer ends 20 passed through these eyes as shown in Figures 1 and 2. These truss rods 19 have their inner ends provided with hooks 21 engaged in the eyes 22 carried by the hub 4 and each of these rods is provided with inner and outer sections having threaded ends engaged by a turn buckle 23 so that adjustment may be made to force the spokes into the sockets 16 the desired amount and retain the rim in a true circular shape.

Turning pins 24 are provided and these extend through openings 25 in the inner flange of the rim and have reduced threaded ends passed through registering openings in contacting rim forming sections and secured by nuts 26 as shown in Figure 5. In order to prevent rope wound upon the shaft 1 from becoming caught upon these turning pins, there has been provided rope guards 27. Four of these rope guards have been shown but it will be understood that as many may be provided as desired. Each of these rope guards is formed from a metal rod bent to provide an inclined intermediate portion 28 having arms 29 and 30 extending from its ends. The arm 30 is riveted to the hub 4 and the arm 29 has its end portion flattened and bent so that it can fit against a spoke and be secured to the spoke by a clamp 31. It will thus be seen that the rope guards extend in overhanging relation to the shaft and will effectively serve to guide the rope away from the turning pins.

In order to retain a tug rope upon the tug wheel there has been provided a dog 32 which is in the form of a bar having one end portion extending beyond the rim of the wheel and its other end portion bent inwardly and terminating in a flattened foot 33 which fits against a spoke 15 and is secured by a clamp 34. Arms 35 extend from the bar forming this dog and are secured to the outer side flange of the rim. It is difficult to place a tug rope upon the tug wheel and therefore there has been provided the usual helpers 36 which extend outwardly from one side of the wheel in a manner so as to coact with the dog 32 for assisting in handling of the bull ropes when putting the ropes on and off of the tug wheel rim 6. These helpers are, however, of a special construction and each is formed from a metal bar bent to provide an arm 37 secured to the spokes and extending transversely of the wheel and outwardly beyond the wheel. A bill portion 38 extends radially of the wheel from the outer end of this arm 37 and the bar is then bent to provide a shank portion 39 terminating in a flattened foot secured to a spoke by a clamp 40. By means of these helpers the tug ropes may be easily moved onto the rim of the tug wheel and will be seated in the grooves 10.

The brake wheel C is in its general construction very similar to the tug wheel and is provided with a rim formed of arcuate blocks 41 disposed between side rings 42 and secured by turning pins 43 which extend transversely through the blocks 41 and rings 42. Each of these pins 43 is formed as shown in Figure 1 and is provided with a reduced stem portion 44 and thicker handle portion 45. A tapered shoulder 46 is provided at the junction of the portions 44 and 45 for fitting into a tapered opening in the outer ring 42 and a collar 47 is provided to engage the outer face of this ring. The free end portion of the stem 44 is threaded and carries a securing nut 48 which is provided with a tapered extension 49 fitting into a tapered opening in the inner ring 42. By this construction the turning pins securely hold the blocks and rings assembled and provide the brake wheel with a strong rim portion. The blocks 41 provide a filler portion formed of annular sections and each section having its blocks in staggered relation to the blocks of an adjacent section.

In order to hold the rim in the proper spaced relation about the hub 5 there has been provided spokes 50 and truss rods 51 which are similar to those used in connection with the tug wheel B. These spokes fit into sockets 52 carried by the hub 5 and have their outer ends screwed into threaded sockets 53 provided in the bosses 54 of the socket members 55. These socket members 55 are very similar to the socket members 11 and each is provided with a base portion 56 curved longitudinally to fit against the inner periphery of the rim and having side flanges 57 perforated as shown at 58 so that the socket member may be secured to the side rings 42. The neck portion 59 connecting the bosses 54 is provided with an opening 60 so that the hooks 61 at the outer ends of the truss rods 51 may be engaged with these socket members. At their inner ends the truss rods are provided with eyes 62 engaged with the eyes 63 of the hub 5 and each is provided with a turn buckle 64 so that the truss rods may be tightened and the wheel adjusted so that the rim is disposed in a true circle about the hub.

There has thus been provided a bull wheel having a tug wheel and a brake wheel of a special construction, these wheels being so constructed that they can be easily and quickly assembled and adjusted so that the rims are properly disposed about the hubs. It will also be noted that the socket members 11 and 55 are so constructed that they can be firmly held in place and have good engagement with the spokes and truss rods.

I claim:—

1. In a bull wheel construction, a shaft, a tug wheel and a brake wheel mounted upon said shaft in spaced relation to each other longitudinally of the shaft, the tug wheel and brake wheel each being provided with a hub fitting upon said shaft, a rim disposed about the hub in spaced relation thereto, socket members carried by said rim and having sockets provided therein in spaced relation to each other transversely of the rim and an eye between the sockets, said hub having eyes intermediate its length and sockets extending from its end portions, spokes extending between the hub and rim and screwed into the sockets of said socket members and slidably fitting into the sockets of said hub, and truss rods having separate end portions engaged with the eyes of the hub and socket members and turn buckles adjustably connecting said end portions.

2. In a bull wheel construction, a shaft, a tug wheel and a brake wheel mounted upon said shaft in spaced relation to each other longitudinally of the shaft, the tug wheel and brake wheel each being provided with a hub fitting upon said shaft, a rim disposed about the hub in spaced relation thereto, socket members carried by said rim, inner and outer spokes carried by said socket members and having loose fitting engagement with the end portions of said hub, and truss rods disposed between the inner and outer spokes and having inner and outer sections connected with the hub and socket members and turn buckles adjustably connecting said sections.

3. In a bull wheel construction, a shaft, a tug wheel and a brake wheel mounted upon said shaft in spaced relation to each other, said tug wheel and brake wheel each comprising a hub, a rim having side flanges, socket members carried by said rim and each provided with a plate like base conforming to the contour of the inner surface of said rim and having side flanges secured to the side flanges of the rim, bosses intermediate the length of said base plate spaced transversely of the base plate and connected by a reduced neck, the bosses provided with threaded sockets and the neck with an eye, spokes having their outer ends screwed into said sockets, said hub provided with unthreaded sockets receiving the inner ends of said spokes and eyes between the sockets, and longitudinally adjustable truss rods engaged with the eyes of the hub and socket members.

4. In a bull wheel construction, a shaft, and a tug wheel carried by said shaft and comprising a hub secured upon the shaft, a rim formed of circumferentially extending bands disposed side by side transversely of the rim and each U-shaped in cross section and having their side walls secured together, said bands providing the rim with inner circumferentially extending channels and external rope seats, socket members carried by said rim and each having a base portion curved longitudinally and corrugated transversely to conform to the contour of the inner surface of the rim and fit into the channels provided by said bands, bosses carried by said base and a neck connecting said bosses, spokes carried by said bosses and engaged with said hub, and truss rods connected with the hub and neck portions of said socket members and adjustable longitudinally.

5. In a bull wheel construction, a shaft, and a tug wheel carried by said shaft and comprising a hub secured upon the shaft, a rim formed of circumferentially extending bands disposed side by side transversely of the rim and each U-shaped in cross section and having their side walls secured together, said bands providing the rim with inner circumferentially extending channels and external rope seats, socket members carried by said rim and fitting into the channels provided in the inner face thereof and each having threaded sockets spaced transversely of the rim and an eye between the sockets, the hub being provided with unthreaded sockets and eyes between its sockets, spokes screwed into the sockets of said socket members and fitting into the sockets of the hub, and truss rods connected with the eyes of the hub and socket members.

6. In a bull wheel structure, a shaft, a tug wheel carried by said shaft and having a hub, a rim, and spokes connecting the hub and rim, and a rope engaging dog, comprising a bar extending radially of the wheel and having an outer portion extending outwardly past the periphery of the rim and an inner portion bent to extend inwardly beneath the rim and extend longitudinally of a spoke in flat contact therewith, a clamp securing the inner end portion of said bar to the spoke, and side arms extending from opposite sides of the bar and secured to said rim.

CLYDE J. GOUGLER.